United States Patent Office 2,800,030
Patented July 23, 1957

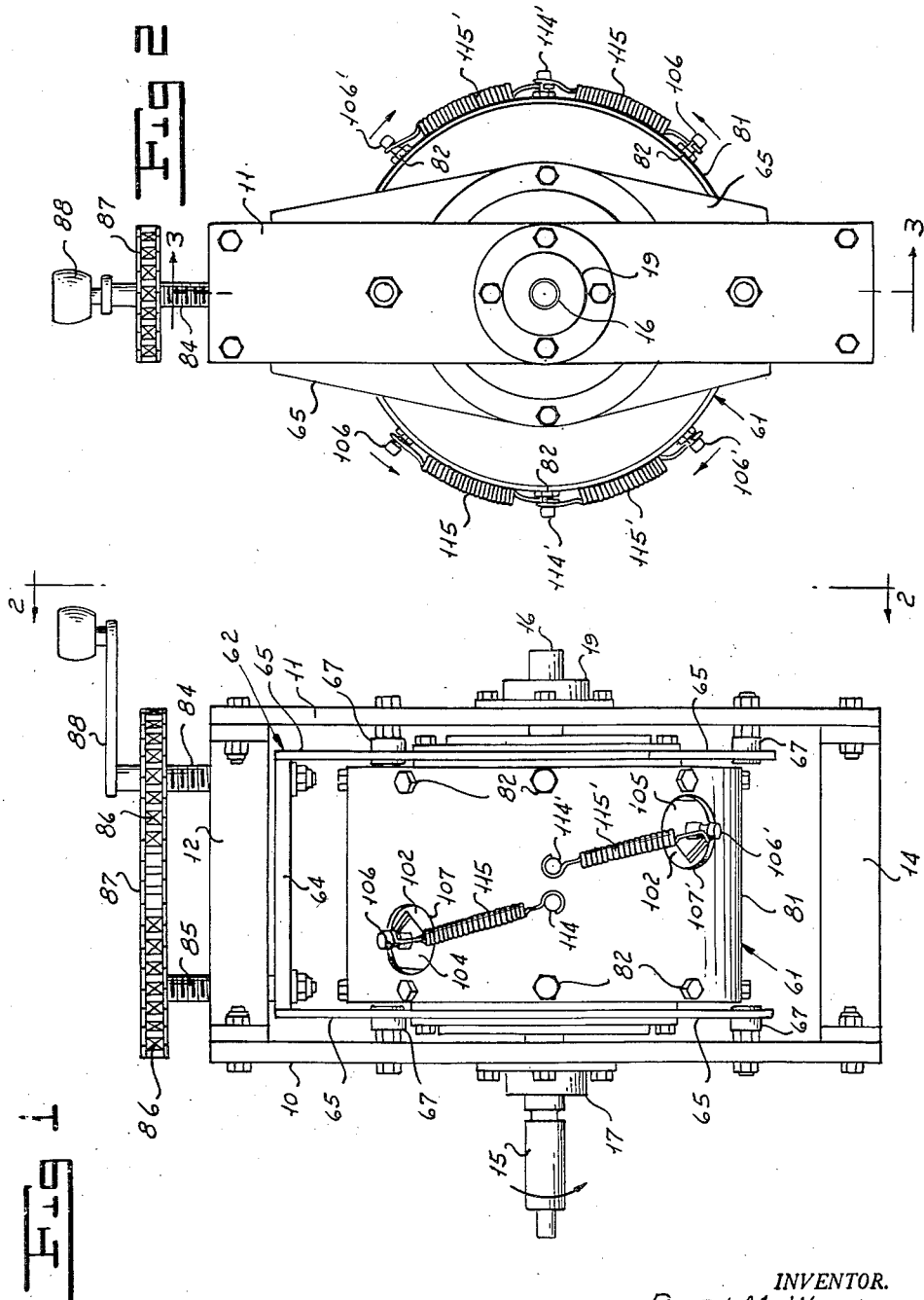

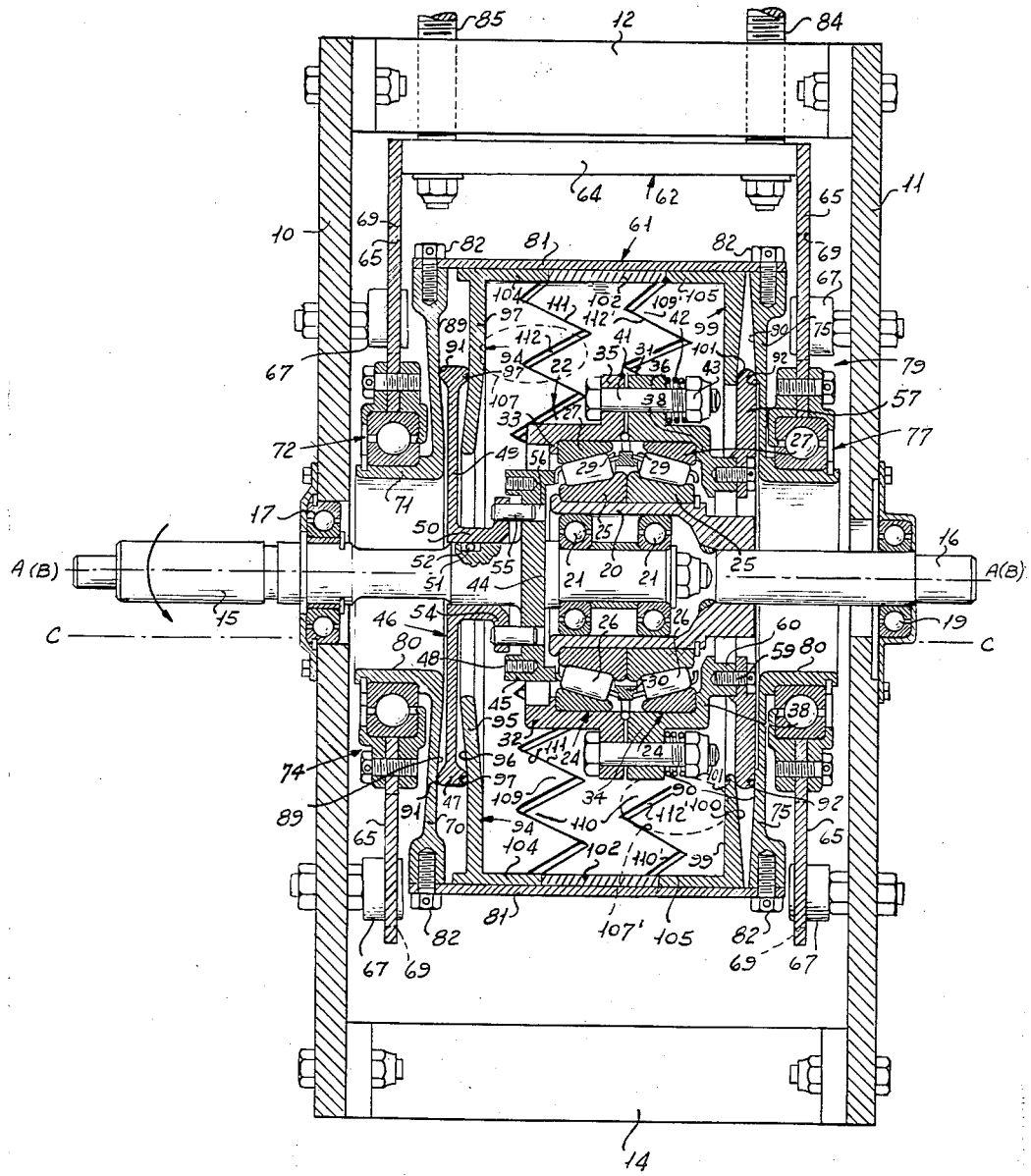

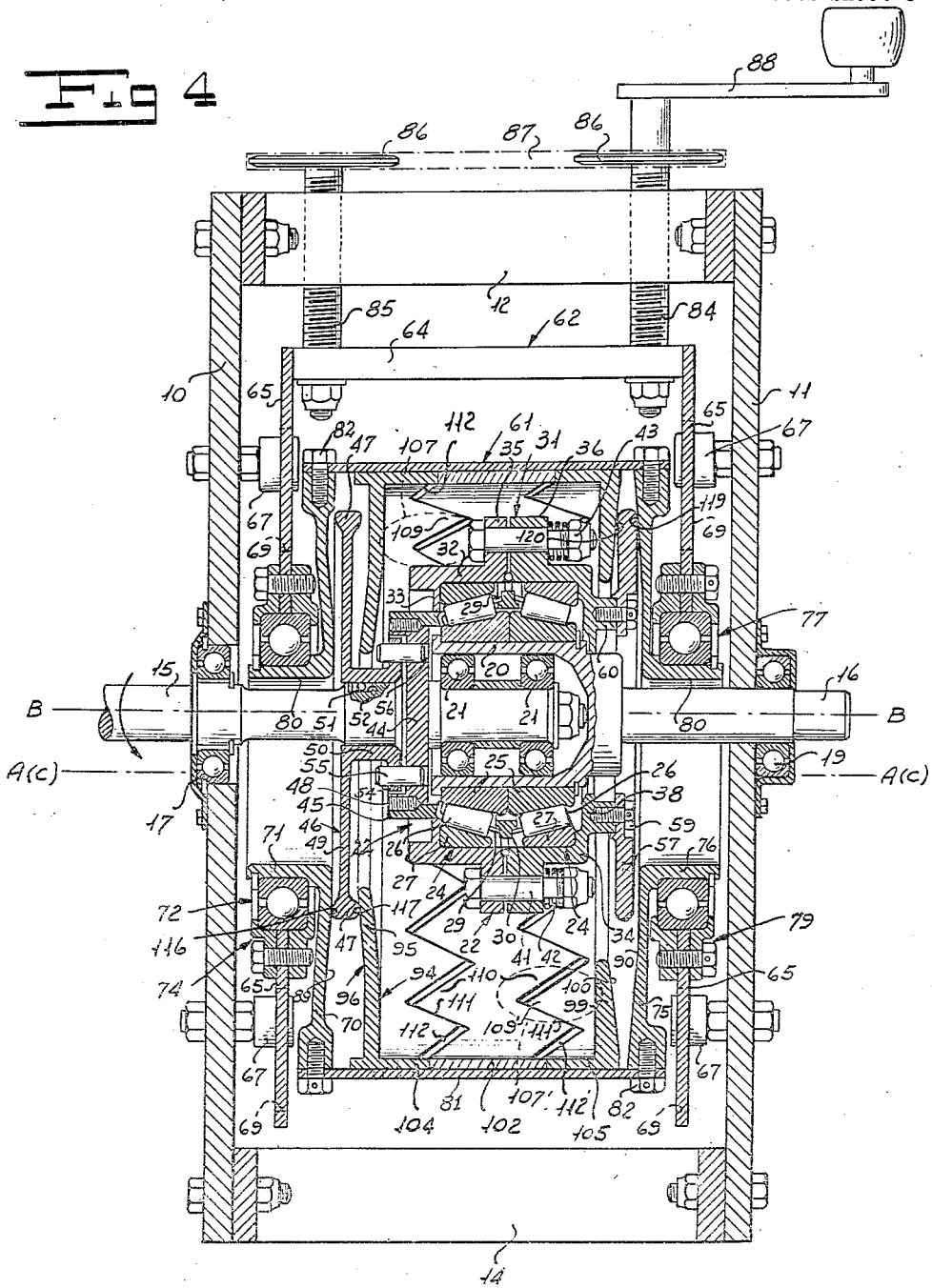

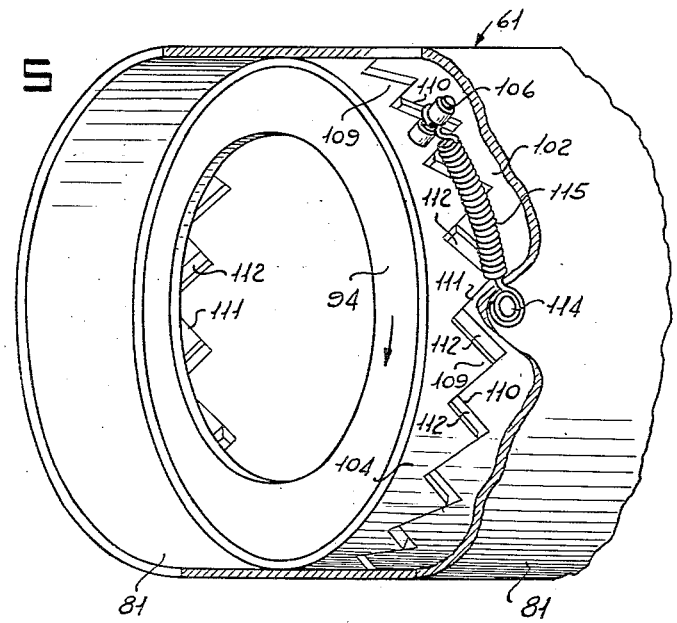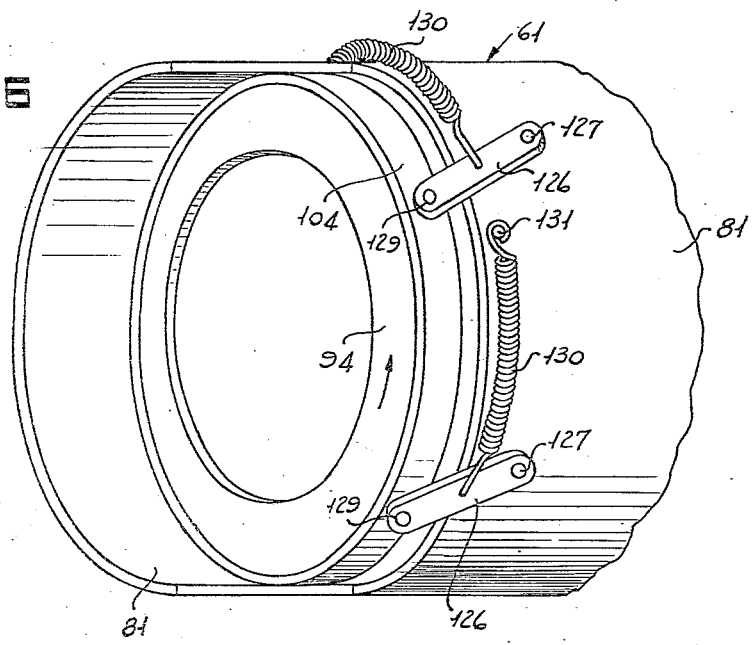

2,800,030

VARIABLE-SPEED TRANSMISSION

Ralph M. Werner, New York, N. Y., assignor to Poised Power Corporation, New York, N. Y., a corporation of New York Application March 20, 1953, Serial No. 343,771

6 Claims. (Cl. 74—199)

This invention relates to apparatus for changing the speed of rotation of a driving element with respect to that of an element driven thereby, and more especially relates to such apparatus wherein the change of speed between the driving and driven elements may be varied over an appreciable range. In a preferred embodiment, the variable-speed transmission of the invention is such that the direction of drive of the driven element may be reversed with respect to that of the driving element, selective variation in the speed of drive of the driven element also being possible in the reversed direction of driving.

Hitherto available variable-speed transmissions have had many limiting and objectionable operational characteristics. Their limited speed variation ratio made it necessary for the driving means or motor to be shut off or disconnected by some form of clutch when it was required that the driven shaft or element be stopped. This also required that, when heavy machinery or vehicles were set in motion, a slipping clutch had to be gradually engaged. The slipping element resulted in wear of surfaces and/or in heat generation, causing loss of transmission efficiency.

Further, in such prior variable-speed transmissions, there continues to be intermotion between the reduction elements even when no reduction is required, the driving and driven elements turning at the same angular velocity under such conditions. Such intermotion is especially objectionable in service such as that in an automobile, wherein the direct, through drive in the speed reducer or transmission is required in excess of 90% of the operating time. In prior variable-speed transmissions, it has also been necessary to provide additional driving elements if a change in direction of rotation is required between the driving and driven members of the transmission.

The variable-speed transmission of the present invention overcomes the above-discussed difficulties of prior transmissions by providing a construction wherein two ratio-governing elements having a driving connection between them may be displaced by infinite degrees from a point where the rotation of the driving shaft and the driven shaft are the same in direction and angular velocity toward a point in which the driven shaft remains substantially at rest while the driving shaft remains rotating. Still further manipulation of the transmission to displace the two elements relative to each other further in the same direction will cause a change in direction of rotation between the driving and driven shaft in the transmission. All of the foregoing changes in the ratios of driving between the driving and driven shaft and in the direction of their relative rotation can be achieved without disconnecting or changing the direction of rotation or the speed of the prime mover connected to the driving shaft. The construction of the transmission is such that, when the two elements have the first predetermined displacement relative to each other to produce a direct or through drive through the transmission, all intermotion between the speed-changing elements of the transmission ceases and there is substantially no wear, frictional heat, or loss of efficiency.

In the preferred embodiment of the variable-speed transmission of the invention, there is employed as the main driving element thereof a planetary gearing, a first shaft of the transmission being drivingly connected to the planets thereof. A second shaft of the transmission, the speed of which is to be varied with respect to that of the first shaft, is drivingly connected with the sun of the planetary gearing. The speed of rotation of the ring of the planetary gearing with relation to the speed of the first shaft is under the control of a novel variable-speed friction gearing connected between the first shaft and the ring of the planetary gearing. The variable-speed friction gearing comprises at least one friction disc mounted on and driven by the first shaft of the transmission and at least one pressure plate having frictional engagement with the disc, the pressure plate being supported on a rotatable member drivingly connected with the ring of the planetary gearing and displaceable laterally from the axis of the first shaft so as to vary the speed ratio between the disc and the pressure plate and thus between the first shaft of the transmission and the ring of the planetary gearing.

When the disc and pressure plate become concentric, the supports for the pressure plate, the sun, planets, and ring of the planetary gearing all rotate in unison, the transmission in effect becoming a 1:1 coupling. As the disc and pressure plate are shifted from a position of concentricity into one of increasing eccentricity, the speed of the driven shaft decreases relative to that of the driving shaft. The speed of the driven shaft becomes zero, even though the driving shaft rotates at a constant speed, when the disc and pressure plate reach such position of eccentricity as to rotate the ring of the planetary gearing at the same speed and in the same direction as such ring would turn if the sun were held stationary and the planets were rotated about the sun at the speed of the driving shaft. As the eccentricity of the disc and pressure plate increases from the position in which the driven shaft is at rest, the driven shaft will be rotated in the reverse direction at an increasingly higher speed.

The invention has among its objects the provision of a novel variable-speed transmission, the speed ratio of which is infinitely variable within appreciable limits. A further object of the invention lies in the provision of such variable-speed transmission wherein a planetary gearing is employed as the main torque-transmitting element thereof.

Yet another object of the invention resides in the provision, in variable-speed transmission of the type indicated, of novel means to vary the speed of the ring of the planetary gearing relative to the speed of the planets thereof. Another object of the invention resides in the provision of a variable speed transmission, capable of producing a reversal of the relative directions of the driving and driven shafts and of variation of speeds in infinite steps in both directions of rotation of the driven shaft, and wherein the driving elements are engaged at all times and the driving shaft may run at the same speed and in the same direction at all times.

Still further objects of the present invention reside in the provision of novel, toothless, planetary gearing, and of novel, variable-speed friction gearing of improved design.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted or that it may be used in any inclined position. Also in both the description and the claims, parts at times may be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawing forming part of this specification, in which:

Fig. 1 is a view in side elevation of a variable-speed transmission made in accordance with the invention, the drum thereof being shown in the same position as in Fig. 3.

Fig. 2 is a view in end elevation of such transmission, the view being taken from the line 2—2 in Fig. 1.

Fig. 3 is a fragmentary view in vertical axial section taken generally along the line 3—3 of Fig. 2, the pressure-plate-carrying drum being concentric with the driving and driven shafts whereby to provide a 1:1 ratio between such shafts, the driving and driven shafts being shown in side elevation and the upper ends of the screws for adjusting the cage being broken away.

Fig. 4 is a view in section, being generally similar to Fig. 3, the pressure-plate-carrying support being displaced from the position thereof shown in Fig. 3 to a position of such eccentricity with respect to the driving and driven shafts of the transmission that the driven shaft is substantially at rest while the driving shaft rotates.

Fig. 5 is a fragmentary view in perspective of an end of the rotatable pressure-plate-carrying support, the view showing the mechanism employed in the transmission of Figs. 1, 2, 3, and 4 whereby the pressure plate is thrust and caused to advance axially the same distance at a plurality of equally spaced points around its axis whereby to maintain the pressure plate truly transverse to the axis of the support under all operating conditions.

Fig. 6 is a fragmentary view in perspective of an alternative embodiment of the pressure-plate-carrying support.

The variable-speed transmission of the illustrative embodiment has a main frame composed of side members 10 and 11, such side members being connected by the top and bottom members 12 and 14, respectively, to form an open box-like structure. The driving shaft 15 and the driven shaft 16 are mounted coaxially of each other, extending through the members 10 and 11, respectively, and being journalled in bearings 17 and 19, respectively, supported on such side frame members. As shown in Figs. 3 and 4, the inner end of shaft 16 is provided with a cup 20 coaxial thereof, there being two spaced bearings 21 between the cup 20 and the inner end of the shaft 15. As a result, the shafts 15 and 16 are rigidly aligned so as to lie coaxial of each other.

Supported on the cup 20 is a planetary gearing unit generally designated 22. The planetary gearing in the embodiment shown is made up of two tapered roller bearings generally designated 24 placed coaxial of each other in opposed relationship. Each of the roller bearings, which are identical, has an inner race or cone (sun) 25, a plurality of rollers (planets) 26, and an outer race (ring) 27. The inner race of each of the bearings 24 is keyed or otherwise nonrotatably secured to the outer surface of the cup 20.

The two bearings 24 are thrust toward each other in an axial direction, so that the cones 25 thereof abut, by the transversely split cage generally designated 31. Each of the bearings 24 has a roller-spacing cage 29 rotatable with the rollers about the axis of the bearing, the two cages 29 for the bearings being connected by the ring member 30, which is secured, as by being welded, to each cage 29. This forms, in effect, an integral roll-spacing cage member for the two roller bearings 24. The cage 31 has a left-hand cup part 32 and a right-hand cup part 34 which confront each other to form a cavity receiving the outer ring members 27 of the two bearings, the bearings being confined between the radially inwardly projecting flange 33 on member 32 and the radially inwardly projecting flange 38 on the member 34. The two parts of the cage member 31 are secured together by means of a plurality of angularly spaced bolts 41 extending through the confronting flange members 35 and 36 of such cage parts, respectively. A spring 42 about the outer end of the bolt beneath the nut 43 thereon insures that the two cage parts shall strongly and constantly urge the ring 27 of each bearing into contact with the rollers 26 thereof and the rollers in turn forcibly into contact with the cone 25 thereof. The engagement between the rollers, ring, and cone of each bearing is such that the members will not slip on each other when the transmission is subjected to the maximum torque for which it is designed.

The driving shaft 15 is provided inwardly of the transmission case with a flange 44, such flange being connected to a ring 45 welded to the left-hand end of the roll-spacing cage 29 by the keying studs 48. By this means, the rollers 26 are rotated about the axis of the shafts 15 and 16 under the drive and control of the cage 29, which rotates at the same angular speed as the shaft 15 about the axis of such shaft. Cage 29, being held coaxial of the bearings 24, insures the correct alignment of rollers 26 and the imposition of a substantially equal driving force of each of them.

Mounted on shaft 15 so as to be axially displaceable therealong within a limited range is the first, driving disc 46 having a rim 47 which overhangs in both axial directions the flange 49 of the disc. Disc 46 has a hub 50 through which shaft 15 extends, there being small balls 51 in angularly spaced grooves 52 on the shaft to permit the ready sliding of the disc 46 therealong. Disc 46 is driven by the shaft 15 by engagement of the pins 55 secured on the radially outwardly turned flange 54 on the hub of disc 46 in the openings 56 in the flange 44 on shaft 15.

A second driven disc 57 is mounted coaxial of the cage 31 so as to have a fixed driving relationship with the outer races 27 of the bearings 24, the disc being attached to the flange 38 of cage 31 by the bolts 59 which extend through the inner edge of the disc into the extension 60 of such flange. Disc 57 is of uniform thickness throughout its major working extent, the outer edge of the disc being smoothly rounded in the embodiment shown.

The driving disc 46 and the driven disc 57 constitute parts of a variable-speed transmission connected in shunt with the planetary gearing unit 22 so as to control the speed of the ring of such unit relative to the driving shaft 15, whereby to control the speed of the cones or sun of the planetary gearing unit and thus the speed of driven shaft 16. Such shunt variable-speed driving means is shiftable from a position in which disc 57 rotates at the same speed as disc 46, and thus the ring of the planetary gearing unit rotates at the same speed as shaft 15, to one in which disc 57 rotates several times faster than disc 46. As is well-known in the planetary gearing art, such change in speed of the ring of the planetary gearing unit 22 relative to shaft 15, with shaft 15 rotating at a constant speed, results in the progressive decrease in the speed of the shaft 16 until it reaches substantially zero, following which shaft 16 rotates with increasing speed in a direction reverse to that of shaft 15.

Discs 46 and 57 have frictional driving engagement with pressure plates mounted adjacent the ends of the rotatable drum 61. Drum 61 is carried on the vertically adjustable subframe 62, such subframe having a top member 64 and the depending parallel side frame members 65 on the opposite ends thereof. Subframe 62 is guided at the top and bottom by the guide rollers 67, mounted on stub shafts on the frame members 10 and 11, the rollers guidingly fitting within the slots 69 in the members 65, whereby the subframe 62 is guided for straight-line movement.

The drum 61 is adjustably positionable with respect to the axis of the driving and driven shafts by means of the spaced screws 84 and 85 rotatably connected at their lower ends to the subframe member 64 and threadedly engaged in bores in frame member 12. The screws 84 and 85 have sprockets 86 keyed thereon, such sprockets being connected by the chain 87. These screws are turned by the crank 88, the drum 61 being shiftable from a position shown in Fig. 3, wherein its axis A—A coincides with the axis B—B of the shafts 15 and 16, to a position somewhat below that shown in Fig. 4. In Fig. 4 the axis A—A lies markedly below the axis B—B, and coincides with the line C—C.

The drum 61 has end members 70 and 75, connected to the outer cylindrical member 81 of the drum by means of the radially projecting studs 82, as shown. The left-hand end 70 of drum 61 is axially flanged outwardly to form the hub 71 on which is positioned the bearing 72. A clamping means 74 engaging the outer race of bearing 72 connects it to the subframe member 65. The drum 61 is similarly supported at the other end thereof, the right-hand end plate 75 being axially extended at the center to form the hub 76 on which is positioned the bearing 77. Clamping means 79 similarly connects the outer race of bearing 77 to the subframe member 65. The hubs 71 and 76 have bores 80 therethrough, such bores surrounding shafts 15 and 16 and substantially exceeding the diameter of such shafts so as to allow the described marked vertical shifting of the drum 61 with respect to shafts 15 and 16.

Drum end plate 70, which constitutes a pressure plate cooperating with the disc 46, has an inner surface 89 which contacts the left-hand edge of the rim 47 of disc 46 over a circle 91 when the drum is coaxial with the shafts 15 and 16, as shown in Fig. 3. Mounted on drum 61 and lying on the other side of the disc 46 is a second pressure plate 94 with a radially inner portion 95 having face 96 engaging rim 47 of disc 46. Surfaces 89 and 96 are substantially mirror images of each other, both surfaces being frustums of cones of large apex angle, the surfaces 89 and 96 converging in a direction radially inwardly. When the drum 61 is coaxial with the shafts 15 and 16, surface 96 contacts the right-hand edge of rim 47 of disc 46 over a circle 97 (Fig. 3), which is of substantially the same diameter as circle 91.

The pressure plate 75 engaging the right-hand surface of disc 57 and the inner pressure plate 99 engaging the opposite surface of disc 57 have inner, disc-engaging, surfaces 90 and 100, respectively, which are frustums of cones of large apex angles, which are substantially mirror images of each other, and which converge in a radially outward direction. With the drum 61 coaxial of the shaft as shown in Fig. 3, the plate 75 and the plate 99 engage the disc 57 over the substantially equal-diametered circles 92 and 101, respectively. The inner pressure plates 94 and 99 and the outer pressure plates 70 and 75 engage their respective discs with a high unit pressure, the inner plates being urged against the discs by means to be described. The pressure is transmitted through the respective disc to the outer pressure plates 70 and 75, the mounting means 51, 52 for the disc 46 allowing its endwise motion, so that it is forcibly clamped between the plates 70 and 94.

With the parts coaxial as shown in Fig. 3, the drum 61 rotates at the same speed as the disc 46, so that the ring of the planetary gearing rotates at the same speed as the planets. Accordingly shaft 16 rotates at the same speed as shaft 15. At such condition, there is no intermotion between the driving parts of the planetary gearing and no intermotion between the discs 46 and 57 and their respective pressure plates, the drum 61 and the planetary gearing unit 22 as a whole rotating at the same speed as the shafts 15 and 16.

When the drum 61 is shifted downward from the position shown in Fig. 3, the speed of shaft 16 progressively decreases until it reaches substantially zero when the axis A—A of the drum lies along the line C—C (Fig. 4). As the drum is shifted from concentricity with the shafts, the rim 47 of disc 46 makes essentially point contact only, at locations below and equidistant from axis B—B, with the surface 89 and the surface 96 of the pressure plates 70 and 94, respectively, the remainder of the rim 47 being relieved from contact with such pressure plates by reason of the described configuration of the inner faces of the plates. With increasing displacement of the axis A—A from the line B—B, the distance from the points of contact 116 and 117 of the rim 47 with its pressure plates 70 and 94, respectively, to the axis A—A of plates 70 and 94 becomes progressively less, so that the plates 70 and 94, and thus the drum 61, are driven at a progressively higher angular speed than the disc 46. Such shifting of the drum 61 causes contact between the disc 57 and its pressure plates, on the other hand, to change from the circles of contact in Fig. 3 to essentially points of contact 119 and 120 between such disc and its pressure plates 75 and 99, respectively, lying above line B—B as shown in Fig. 4. Points 119 and 120 lie at substantially the same distances from axis B—B as do the points of contact of the rim 47 of disc 46 with its pressure plates. During increase in eccentricity of the drum 61, the pressure plate 99 is progressively pried away from the plate 75 by the disc 57, the disc being strongly engaged between pressure plates 75 and 99 by the pressure-exerting means to be described.

Contact between the disc 57 and its pressure plates is confined to zones near the rounded outer edge of the disc. Consequently the distance from the center of disc 57, on line B—B, to such points of contact remains substantially constant. The location of contact on the pressure plates for disc 57, however, shifts from the circles near the inner edge of each such plate, as shown in Fig. 3, progressively outwardly of the plates as the eccentricity of the drum increases, the distance from such points of contact on the pressure plates to the axis A—A progressively increasing. Therefore upon downward shifting of drum 51 from the position of Fig. 3, pressure plates 75 and 99 drive disc 57 at a progressively higher speed, the disc 57 and its associated pressure plates acting as a variable change-speed mechanism connected in series with, and changing speed in the same sense as, the change-speed mechanism made up of disc 46 and its associated pressure plates.

The speed of the cage 31 and thus of the ring of the planetary gearing unit 22 thus varies with the degree of eccentricity of drum 61. When the axis A—A of the drum lies on the line C—C, as shown in Fig. 4, the shaft 16 will remain at rest even though shaft 15 is driven. Further progressive shifting of the axis of the drum 61 downwardly from the line C—C to a position thereof below that shown in Fig. 4 will result in reversal of rotation of shaft 16 and the driving of shaft 16 at an increasingly higher speed in such reverse direction. Thus the variable-speed mechanism of the invention allows the prime mover connected to driving shaft 15 to rotate constantly, the shaft 16 being variable in speed from a ratio of 1:1 with respect to shaft 15 when axes A—A and B—B coincide, to a ratio of 1:0, when axis A—A lies on line C—C, and within an appreciable range of rotation in a reverse direction at a selectively variable speed when axis A—A is shifted below line C—C, all without disengaging any of the driving elements from each other.

The means whereby the inner pressure plates 94 and 99 are constantly thrust away from each other in an axial direction and are maintained in planes substantially normal to axis B—B regardless of unsymmetrical forces imposed thereon will be more readily understood by a consideration of Fig. 5. A central annular member 102 is disposed on the inside of peripheral member 81 of the drum 61. Member 102 is secured on the drum by means of the studs 114, at the left in Fig. 1, and 114′, at the right in that figure. The pressure plate 94 has an inner peripheral flange 104, and pressure plate 99 has an inner peripheral flange 105, both such flanges being secured to the inner surface of member 81 of the drum so that the plates are slidable for a limited extent axially of the drum and rotatable through a limited angle about the axis of the drum. Two studs 106 screwed into flange 104 diametrically opposite each other extend through openings 107 in member 81 to actuate plate 94. Similar studs 106' extend through slots 107' in member 81 to actuate plate 99. The opposite end surfaces of the member 102 have a plurality of similar equally spaced teeth 110 thereon, such teeth being symmetrical in radial axial planes of the drum and having an included angle of 90°. Similar teeth 109, complementary thereto, are disposed on the inner edges of flanges 104 and 105 of the pressure plates. A strong coil tension spring 115 extends between each stud 114 and its mate 106 connected to the flange of the pressure plate 94, the springs 115 constantly urging the pressure plate 94 and its flange 104 counter-clockwise relative to member 102 as indicated by the arrows in Fig. 2. As the pressure plate 94 and its flange 104 are thus turned, the teeth 109 tend to climb up out of the pockets between the teeth 110 to create an interface 111 between the fixed and movable teeth and a space 112 between the other sides of such teeth. Consequently the pressure plate 94 is urged in an axial direction to the left in Fig. 1 toward its disc by forces acting at each interface 111, whereby the disc 46 is firmly clamped between the movable pressure plate 94 and the fixed pressure plate 70. Consequently the plate 94 is held in a true plane transverse to the axis of the drum regardless of the fact that when the drum is in an eccentric position, the force exerted by the disc on pressure plate 94 is unsymmetrical with respect to the axis of the drum.

The pressure plate 99 is constantly urged to the right in Fig. 1 by similar mechanism. Coil tension springs 115' act between the fixed studs 114 and the movable studs 106' affixed to flange 105, thereby imposing a torque of flange 105 in a clockwise direction, as indicated by the arrows in Fig. 2. This causes the same interaction between the teeth 110' at the right on member 102 and the opposing complementary teeth 109' on flange 105, as described above in connection with flange 104 of plate 94.

It is to be noted that the directions of the torques imposed on pressure plates 94 and 99 by their respective discs when shaft 15 is rotated in the direction of the curved arrows in Figs. 1, 3, and 4 are the same as that imposed on them by their springs 115 and 115' (indicated by the short curved arrows in Fig. 2). When the transmission is driven in the indicated direction, therefore, the means thrusting plates 94 and 99 against their discs is self-energizing.

An alternative pressure-plate-supporting and thrusting mechanism is shown in Fig. 6, wherein the same reference characters as those in Fig. 5 are employed to designate parts which are the same as those in the structure in Fig. 5. Fig. 6 shows such alternative means for supporting the pressure plate 94. It is to be understood that a similar means will be used to support plate 99. As shown, plate 94 is supported coaxial of drum 61 by a plurality of similar links 126 spaced equally about the axis of the drum. One end of each link is pivoted to shell 81 of the drum by pin 127. The other end of each link is pivoted to flange 104 of plate 94 by pin 129. When the plate 94 is operatively mounted in the transmission, the links 126 are disposed at the same acute angle with respect to its axial plane through the drum containing the pivot pin 127. A coil tension spring 130, connected at one end to a point intermediate the ends of each link 126 and at the other end to a pin 131 affixed to sheath 81 of the drum, constantly urges each link 126 in a clockwise direction and thus the plate 94 to the left (Fig. 6). The mechanism of Fig. 6 is self-energizing when the shaft 15 is rotated in the direction opposite the curved arrows in Figs. 1, 3, and 4, that is, when drum 81 rotates in the direction of the arrow in Fig. 6.

The pressure-plate-supporting and endwise-thrusting mechanisms of Figs. 5 and 6 are both advantageous in that the point contact between the discs 46 and 57 and their respective pressure plates is always radially inward of the force exerted on the inner pressure plates by the teeth of Fig. 5 and the links of Fig. 6. This eliminates rocking of the axes of the inner pressure plates out of alignment with the axes of the discs, the outer pressure plates, and the drum supporting them. The self-energizing action of both such means causes the discs 46 and 57 to be clamped more firmly as the torque requirements of the transmission are increased, and reduces the pressures between the plates and discs under light loads, thereby improving the efficiency and prolonging the life of the unit. Further, the thrust and clamping actions upon the inner pressure plates are directly transmitted thereto by the teeth of Fig. 5 and the links of Fig. 6, no other movable thrust-transmitting element or elements being employed. The construction is thus particularly free from wear in the movable pressure-plate-supporting and clamping mechanism.

I claim:

1. A variable-speed transmission comprising a drive shaft, a first generally radial flange on such shaft, an axially extended rim on such flange, a rotatable support mounted to be displaceable between a position coaxial of the drive shaft and a position markedly eccentric thereto, a first pressure plate on the support located generally parallel to the first flange and forcibly contacting the rim on the first flange, the first pressure plate being of frusto-conical shape and inclined radially inwardly and toward the plane of the first flange in that direction, the rim of the first flange having generally a point contact with the first pressure plate when the support is eccentric relative to the drive shaft and having contact with the first pressure plate over a circle when the support is concentric with the drive shaft, a second rotatable disc mounted coaxial of the drive shaft, and a second pressure plate on the support forcibly contacting the second disc, the second pressure plate being frusto-conical and having its surface inclined radially inwardly and axially away from the plane of the second disc in that direction so as to have generally a point contact with the second disc, at a point on the other side of the axis of the drive shaft from that at which the first pressure plate contacts the first flange, when the support is eccentric relative to the drive shaft.

2. A variable-speed transmission comprising a drive shaft, a first generally radial flange on such shaft, an axially extended rim on such flange, a rotatable drum mounted to be displaceable between a position coaxial of the drive shaft and a position markedly eccentric thereto, a pair of first pressure plates on the drum located forcibly to contact the respective opposite edges of the rim on the first flange, both first pressure plates being of frusto-conical shape and converging radially inwardly toward each other, the rim of the first flange having generally a point contact with each of the first pressure plates when the drum is eccentric relative to the drive shaft and having contact with each first pressure plate over a circle when the drum is concentric with the drive shaft, a second rotatable disc mounted coaxial of the drive shaft, and a pair of second pressure plates on the drum on opposite sides of the second disc and forcibly contacting the second disc, the second pressure plates being frusto-conical and having their surfaces diverging in a direction toward the axis so that each has generally a point contact with the second disc at points on the other side of the axis of the drive shaft from that at which the first pressure plates contact the first flange when the drum is eccentric relative to the drive shaft.

3. A variable-speed transmission comprising a drive shaft, a first disc attached to the shaft generally transverse thereto, the first disc having a rim considerably wider axially than its radially inner portion, a second disc spaced from and coaxial with the first disc, means mounting the second disc for rotation about its axis, a drum surrounding the discs, means for supporting the drum for rotation about its axis, means for laterally displacing the axis of the drum, annular end plates on the drum, the end plates lying axially outwardly of and in contact with each of the respective discs, annular pressure plates on the drum, one such pressure plate lying axially inwardly of and in contact with each of the respective discs, means constantly to urge the pressure plates away from each other to thrust them into contact with their respective discs and such discs into contact with their respective end plates, the end plate and pressure plate in contact with the first disc both being inclined radially inwardly to converge toward their inner edges, the end plate and pressure plate in contact with the second disc both being inclined radially outwardly to converge toward their outer edges, the discs contacting their respective end and pressure plates on circles when the drum is concentric with the discs, the discs having essentially point contact with each of their respective end and pressure plates when the drum is eccentric with respect to the discs, such points of contact of the first and second discs lying on opposite sides of their common axis of rotation.

4. A variable-speed transmission comprising a disc and a pressure plate mounted to rotate in planes parallel to each other and in contact with each other, a first one of said members being movable axially toward and away from the second member, means for laterally displacing the disc and the pressure plate relative to each other to vary the ratio of their speeds, and means constantly to urge the first member toward the second member and to maintain the disc and pressure plate parallel regardless of any forces between them which are unsymmetrical with respect to their axes, said last-named means comprising a circular abutment member of large radius coaxial of the first member, and adjustable means acting between the abutment member and the first member to thrust the first member axially in the same amount at a plurality of points regularly spaced about the axis of the first member.

5. A variable-speed transmission comprising a disc and a pressure plate mounted to rotate in planes parallel to each other and in contact with each other, a first one of said members being movable axially toward and away from the second member, means for laterally displacing the disc and the pressure plate relative to each other to vary the ratio of their speeds, and means constantly to urge the first member toward the second member and to maintain the disc and pressure plate parallel regardless of any forces between them which are unsymmetrical with respect to their axes, said last-named means comprising a circular abutment member having a radius substantially equal to that of the first member, said circular abutment member being positioned coaxial of the first member, a plurality of regularly spaced teeth on the side of the abutment member facing the first member, a circular thrust member having a radius substantially equal to that of the circular abutment member and confronting such abutment member, said thrust member being connected to the first member, a series of teeth complementary to those on the abutment member on the thrust member and interfitting therewith, and means acting between the abutment member and the thrust member constantly to urge them to rotate in opposite directions, whereby the interfitting teeth and the thrust member and the abutment member function to thrust the first member axially with respect to the second member in the same amount at a plurality of points regularly spaced about the axis of the first member.

6. A variable-speed transmission comprising a disc and a pressure plate mounted to rotate in planes parallel to each other and in contact with each other, a first one of said members being movable axially toward and away from the second member, means for laterally displacing the disc and the pressure plate relative to each other to vary the ratio of their speeds, and means constantly to urge the first member toward the second member and to maintain the disc and pressure plate parallel regardless of any forces between them which are unsymmetrical with respect to their axes, said last-named means comprising a circular abutment member having a radius substantially equal to that of the first member, said circular abutment member being positioned coaxial of the first member, a plurality of regularly spaced links pivotally connected at one end to the abutment member and at the other end to the outer edge of the first member, each of the links lying at the same acute angle relative to a plane axial to the abutment member and passing through the link, and means acting between the abutment member and the pressure plate to urge them to rotate in opposite directions whereby to straighten the links and to force the disc and pressure plate together.

References Cited in the file of this patent

UNITED STATES PATENTS

| Re. 18,175 | Erban | Sept. 1, 1931 |
| 1,999,544 | Madle | Apr. 30, 1935 |
| 2,100,632 | Chilton | Nov. 30, 1937 |
| 2,216,190 | Erban | Oct. 1, 1940 |
| 2,583,496 | Rougelot | Jan. 22, 1952 |
| 2,595,439 | Arato | May 6, 1952 |
| 2,646,696 | Kepes | July 28, 1953 |